March 29, 1966 — J. J. CALDWELL, JR — 3,243,721
TEMPERATURE CONTROLLED FILTER GAS CELL IN GAS
CELL FREQUENCY STANDARD
Filed Oct. 8, 1962 — 2 Sheets-Sheet 1

INVENTOR.
JOSEPH J. CALDWELL, JR.
BY
AGENT

March 29, 1966   J. J. CALDWELL, JR   3,243,721
TEMPERATURE CONTROLLED FILTER GAS CELL IN GAS
CELL FREQUENCY STANDARD
Filed Oct. 8, 1962                              2 Sheets-Sheet 2

INVENTOR.
JOSEPH J. CALDWELL, JR.
BY
AGENT

# United States Patent Office 3,243,721
Patented Mar. 29, 1966

3,243,721
TEMPERATURE CONTROLLED FILTER GAS CELL
IN GAS CELL FREQUENCY STANDARD
Joseph J. Caldwell, Jr., Rolling Hills, Calif., assignor, by
mesne assignments, to TRW Inc., a corporation of
Ohio
Filed Oct. 8, 1962, Ser. No. 228,949
5 Claims. (Cl. 331—3)

This invention relates generally to the frequency standard art and, more particularly, to the optical pumping art as applied to frequency standards and stable oscillator systems. In a system of this type a quantum energy characteristic in a gyromagnetic medium is used as a basis for establishing a constant frequency output signal.

Masers, gas cell frequency standards, atomic clocks and the like utilize the absorption, transmission, and emission characteristics of a resonant medium as a basis for establishing a control signal. In such applications, it is often necessary to induce the particles comprising a resonant medium to occupy preselected quantum energy levels resulting in an overpopulation of a first preselected quantum energy level as compared with a second preselected quantum energy level. Since the energy separation between these two quantum energy levels is accurately known, transistions from the overpopulated level to the other level provide a resonance condition for deriving the control signal.

The preferred method of achieving this overpopulation condition is by a process termed optical pumping. In this process, an optical pumping light beam containing electromagnetic radiation having energy in a preselected wave length traverses the resonant medium at a wavelength corresponding to a particular quantum energy transition of the resonant medium. The resonant medium absorbs energy from the optical pumping light beam and thereby the particles comprising the resonant medium are induced to occupy preselected quantum energy levels in which there is a greater population of particles in one of the two preselected quantum energy levels than the other. Therefore, as the population difference is increased, the control signal definition is enhanced.

It has been found that the more monochromatic the optical pumping light beam is in the preselected wavelength, the more efficient is the optical pumping process in inducing the overpopulation described above. Filtering techniques using isotopes of the resonant medium are used to eliminate undesired wavelengths from the optical pumping light to thereby achieve the desired monochromatic wavelength.

In the preferred embodiment, an optical pumping lamp containing rubidium 87 ($Rb_{87}$) isotope is used to pump $Rb_{87}$ contained in a gas pumping cell. In order to depopulate energy from only one of the energy levels, the light from the pumping lamp is made more monochromatic by removing one of the two spectral emissions from the $Rb_{87}$. A review of the spectral emissions of rubidium 85 ($Rb_{85}$) shows two emissions, one of which partially overlaps one of the $Rb_{87}$ lines. This phenomenon is implemented by using a gas cell containing $Rb_{85}$ in order to filter the $Rb_{87}$ light and make the radiations reaching the pumping cell substantially monochromatic.

The intensity of the light passing through the $Rb_{87}$ pumping cell is continuously monitored to indicate the effectiveness of the pumping. Under normal conditions energy is absorbed by the $Rb_{87}$ gas when the eneregy of the gas is raised, which fact is indicated by a reduction in the intensity of the light output as a result of this absorption of energy. The frequency standard is constructed and arranged to detect changes in the light intensity as the means for maintaining a constant output frequency. It has been discovered that extraneous effects change the intensity which were not directly caused by the absorption of energy in the pumping cell.

This invention is concerned with overcoming intensity variations caused by the use of a filter gas cell when attempting to generate a monochromatic light in a pumping cell. These intensity variations resulting from using an $Rb_{85}$ filter gas cell in combination with an $Rb_{87}$ pumping lamp and an $Rb_{87}$ pumping cell have been substantially eliminated by means of a heat sink located within the filter gas cell. The thermal capacity of the heat sink is arranged to provide a temperature that is less than the temperature of the inside surface of the filter gas cell through which the light from the optical pumping lamp must pass.

Further objects and advantages of this invention will be made more apparent by referring now to the accompanying drawings wherein.

Figure 1:
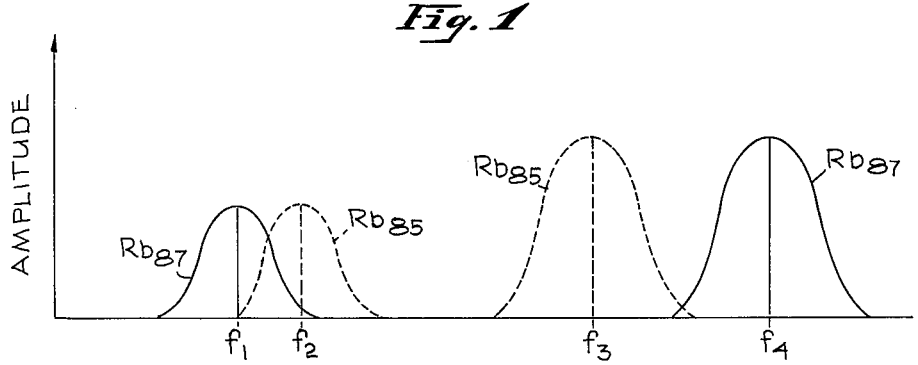
FIG. 1 illustrates the spectral frequency emissions from the excited atoms of $Rb_{87}$ and $Rb_{85}$.
Figure 2:
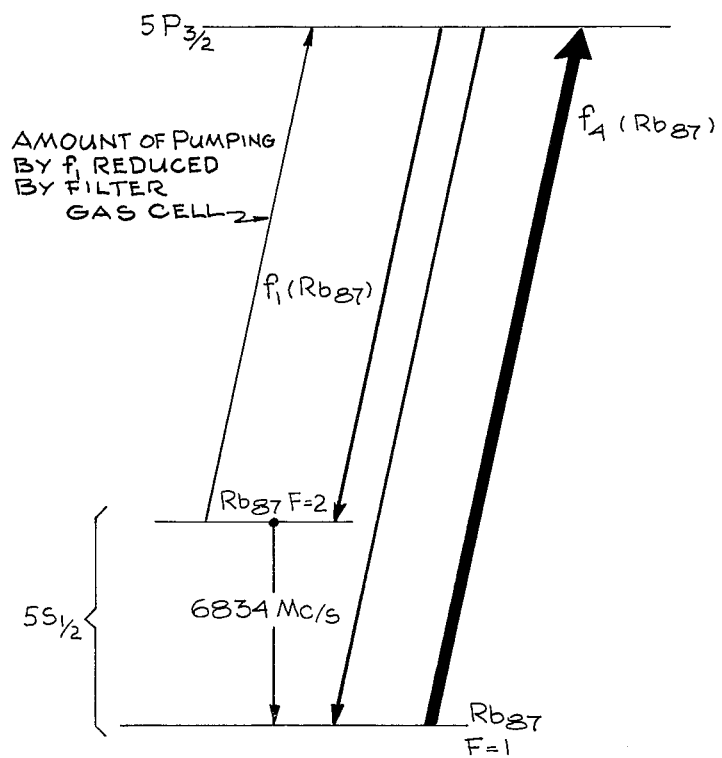
FIG. 2 is a simplified diagram representing the energy levels of an atom of $Rb_{87}$.

When electromagnetic radiation in the form of an optical pumping light beam, which contains photons having energy in a wavelength equivalent to $f_4$, as shown in FIG. 1, impinges on a collection of $Rb_{87}$ atoms in the $5S_{1/2}$ ground energy state, illustrated in FIG. 2, those atoms in the magnetic substrates of the $F=1$ level of the $5S_{1/2}$ ground state are temporarily raised to the $5P_{1/2}$ first optically excited state. Upon a drop down transition of the $5S_{1/2}$ state, the atoms may occupy positions in the magnetic substates of either the $F=2$ or $F=1$ levels of the $5S_{1/2}$ state. Electromagnetic radiation having a wavelength equal to $f_4$ and $f_1$ is emitted from the $Rb_{87}$ during these drop down transitions. In FIG. 2, the thickness of lines between energy levels indicates the relative amount of atoms that are pumped. As this optical pumping process continues, there is a depletion of the number of atoms in the $F=1$ level of the $5S_{1/2}$ state and an increase in the number of atoms in the $F=2$ level of the $5S_{1/2}$ state which tends to provide the desired overpopulation condition. At the same time, however, the optical pumping light beam contains photons having energy in a wavelength equivalent to $f_1$, tending to depump the magnetic substates at the $F=2$ level to the magnetic substates of the $F=1$ level. In other words, the pumping action of $f_1$ and $f_4$ would be nullified. Therefore to achieve a population difference, for example, by having more atoms in the $F=2$ level than the $F=1$ level, it is necessary that the optical pumping light beam be filtered. The degree of population difference that can be achieved is thus a net effect and the more monochromatic the optical pumping light beam is in $f_4$, compared with $f_1$, the greater will be the population difference which will result in a stronger resonance signal between these two energy levels.

The energy levels of interest in practicing this invention are associated with the spectral frequencies of $Rb_{87}$, identified as $f_1$ and $f_4$ in FIG. 1. A review of the emission characteristics of $Rb_{85}$, which are illustrated as frequency $f_2$ and $f_3$ in FIG. 1, shows a substantial overlap as determined by the amount of buffer gas pressure in the bandwith characteristics of $f_1$ in $Rb_{87}$ and $f_2$ in $Rb_{85}$. This phenomenon is utilized by constructing a filter cell containing $Rb_{85}$ as the means for reducing the intensity of the $f_1$ emission of $Rb_{87}$.

Referring now to FIG. 2, there are illustrated the energy levels associated with $Rb_{87}$. These levels exist in the presence of an applied weak unidirectional magnetic field that induces Zeeman splitting. When Zeeman splitting occurs, the $5S_{1/2}$ ground energy state includes those quantum levels identified as $F=1$ and $F=2$. In the practice of this invention the $5S_{1/2}$ ground state is made use of by pumping the atoms to the excited state identified as $5P_{3/2}$. The transition betwen the $F=1$ and $F=2$ of the $5S_{1/2}$ ground state is 6834 megacycles (mc.) and provides the resonant condition for establishing a control signal. The pumping effected by frequency $f_1$ of $Rb_{87}$ is substantially reduced by means of the gas filter cell absorbing the frequency $f_2$ of $Rb_{85}$. The foregoing principles are utilized in this invention to provide improved optical pumping light beam frequency standard.

Figure 3:
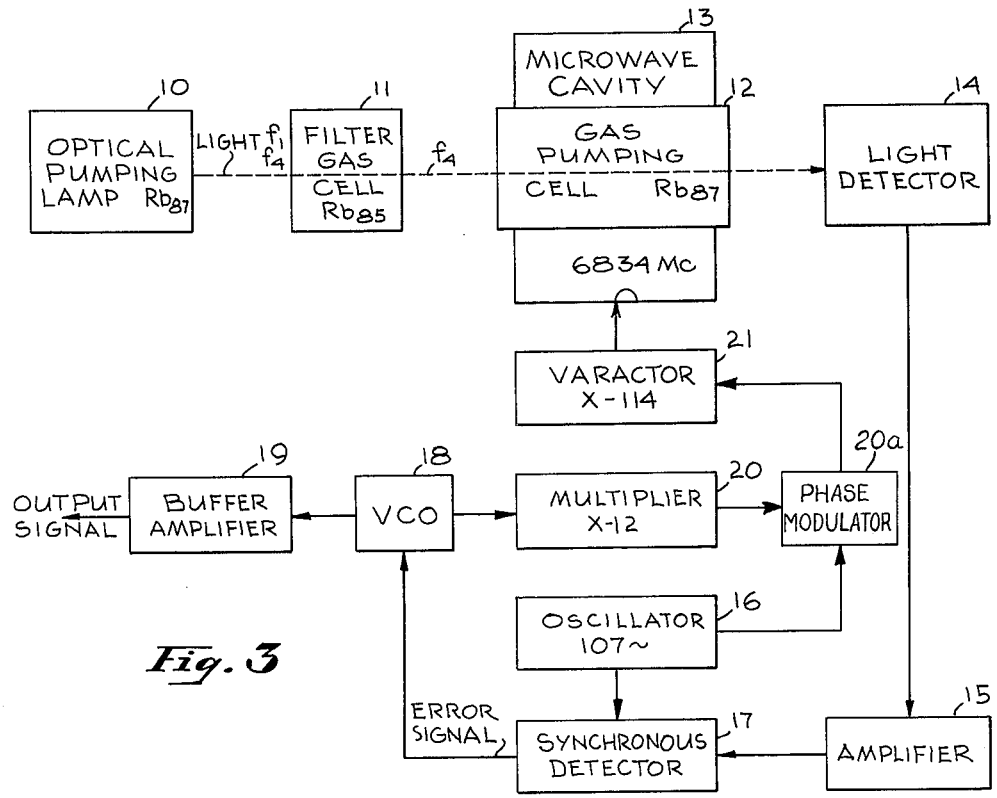
FIG. 3 is a block diagram of a frequency standard.

Referring now to FIG. 3, there is shown a block diagram of a frequency standard comprising an optical pumping lamp 10, containing $Rb_{87}$. The light output of the optical pumping lamp 10 contains frequencies $f_1$ and $f_4$, as illustrated in FIG. 1. The light beam is adapted to pass through a filter gas cell 11, containing $Rb_{85}$. As previously explained in connection with FIGS. 1 and 2, the intensity of $f_1$ is reduced by the absorption effect of the $f_2$ frequency generated by the $Rb_{85}$ and contained in the filter gas cell 11. As a result of this filtering action the light passing through the gas filter cell 11 may be considered monochromatic, which we have defined as having a spectral emission of $f_4$ that is substantially greater than the spectral emission of $f_1$. The filter beam of light now containing $f_4$ is caused to pass through a gas pumping cell 12, containing $Rb_{87}$. Transverse of the gas pumping cell 12 is a microwave cavity 13 that is tunable to the transition frequency between the $F=1$ and $F=2$ energy levels of the $5S_{1/2}$ ground state. For $Rb_{87}$ this transition frequency is equal to 6834 mc./sec., which is the frequency to which the microwave cavity 13 is tuned. The action of the light in passing through the gas pumping cell 12 causes an absorption of energy from the light source by the atoms of $Rb_{87}$, as they are raised to the $5P_{3/2}$ energy state. This absorption of energy is detected by means of a light detector 14 as a change in the intensity of the light beam. The output of the light detector 14 is fed to a suitable amplifier 15, the output of which represents an amplified signal indicating an absorption at the detected frequency $f_4$. In order to make the over-all system extremely accurate, the microwave energy fed into the microwave cavity 13 is frequently modulated at the rate of 107 cycles by means of a 107 cycle oscillator 16. The synchronous detector 17 continuously compares the 107 cycle output from the amplifier 15 with the output of the oscillator 16 in order to generate an error signal based on the difference between these two signals. An error signal from the synchronous detector is in the form of a varying voltage having the proper amplitudes and sense for controlling a voltage controlled oscillator (VCO) 18 operating at a frequecy of approximately 5 megacycles. The output signal of the system is obtained from the VCO 18 after it has first passed through a buffer amplifier 19. The microwave signal for energizing the microwave cavity 13 and depopulating the $5C_{1/2}$, $F=2$ energy state, is obtained from the VCO 18 by means of a multiplier 20. The output of the multiplier 20 is phase modulated by the 107 cycle output from the oscillator 16 in a phase modulator 20a the output of which controls a varactor 21, which couples the multiplied 6834 mc. signal into the microwave cavity 13, thereby closing the loop. The varactor 21 is a non-linear device having the ability to generate high order multiples of the original current flowing through the varactor. The 114th harmonic is selected to energize the cavity 13. The output of oscillator 16 phase modulates the multiplied signal in the multiplier 20, which has the effect of imparting the 107 cycle variation into the microwave cavity 13 as a modulation of the 6834 mc. signal. The detected signal appearing at the light detector 14 will be coherently detected in the synchronous detector 17 for determining an error signal.

A review of the description and the operation of the system described in connection with FIG. 3 will show the importance of accurately measuring the intensity variations at the light detector 14. It will be appreciated also that any extraneous effects changing the intensity of the detected light will have the effect of changing the frequency of the VCO 18. Intensity variations caused by the filter gas cell 11 have been discovered and corrected by the teaching contained herein.

Figure 4:
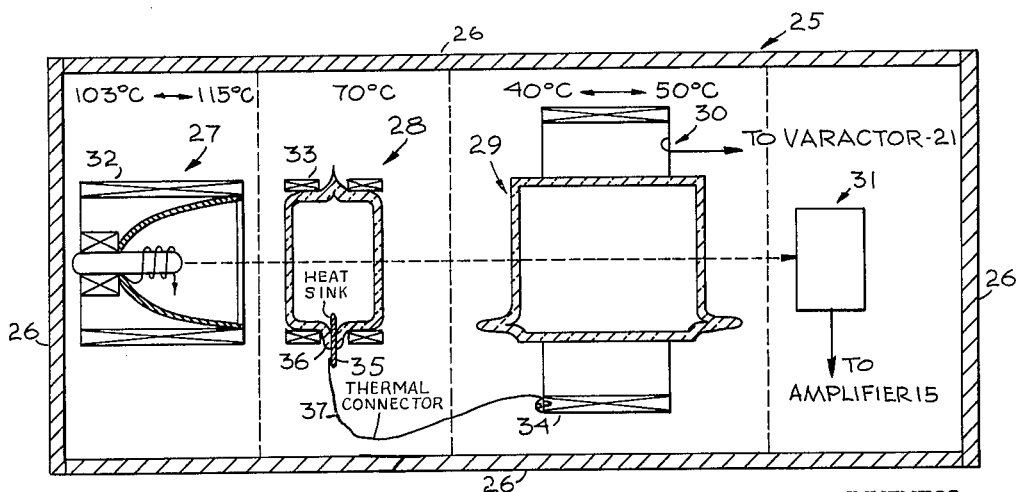
FIG. 4 illustrates the basic structure comprising the optical lamp, the filter cell and the pumped cell.

Referring now to FIG. 4, there is shown a cased unit 25 comprising an electromagnetic shield 26, completely surrounding an optical pumping lamp 27, a filter gas cell 28, a combination gas pumping cell 29 and a microwave cavity 30, and a light detector 31. The defined units are aligned as indicated to thereby allow the light beams generated in the optical pumping lamp 27 to pass to the light detector 31 in an unobstructed manner. In the preferred embodiment described, the optical pumping lamp 27 containing $Rb_{87}$ must operate within a temperature range of 103° C. to 115° C. and preferably at a constant temperature gradient for highest efficiency. The filter gas cell 28 containing $Rb_{85}$ must operate at a temperature of substantially 70° C. for proper operation. The gas pumping cell 29 containing $Rb_{87}$ must operate within a range of 40° C. to 50° C. and preferably at a constant temperature of 50° C. Suitable separate heating on each of the units, such as heating coils 32 on the optical pumping lamp 27, heating coils 33 on the filter gas cell 28, and heating coils 34 about the gas pumping cell 29 and microwave cavity 30, provides the means for obtaining the separately controlled temperatures indicated. In order to maintain the different temperature gradients indicated, the inside of the case 25 is filled with suitable dielectric material having low heating conductivity such as polyether foam. The defined materials maintain the heat within the limits specified and also provide mechanical support against jarring and other mechanical vibrations. Within the environment described, it was discovered that condensation of the $Rb_{85}$, located within the filter gas cell 28, on the light transmitting surfaces resulted in a decrease in light intensity with respect to time, resulting in a constant increase in frequency of the over-all system, thereby materially affecting the long term stability of the unit. Having discovered this condensation on the inside surface of the filter gas cell as the main cause of the change in the long term stability of the system, a suitable heat sink, comprising a tungsten probe 35, sealed in the tip off 36 of the glass envelope comprising the filter gas cell 28, was installed. Subsequent investigation indicates that thermal radiation from the relatively warm glass surfaces of the filter gas cell 28 to the relatively cool glass surface of the gas pumping cell 29 may have provided a local area on the inside surface of the filter gas cell that was less than the desired 70° C. temperature, thereby causing condensation. The tungsten probe 35 is connected through a suitable thermal conductor 37 to a lower temperature point which is temperature regulated within case 25. The thermal conductor size has been chosen to make the tungsten probe 35 the lowest temperature point within the filter gas cell 28. Since the coldest temperature in the cell determines the filtering action of the $Rb_{85}$, the thermal conductivity of the thermal conductor 37 is accurately controlled and selected to obtain the desired temperature within the cell.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein, except as defined by the appended claims.

The embodiments of the invention in which an exclusive property or privilege is claimed are defined as follows:

1. In combination,
  generating means for generating an optical pumping light beam having energy in pumping and depumping frequencies of electromagnetic radiation, said generating means located in a first temperature controlled area, a filter gas cell located in close proximity to said first temperature controlled area having walls transparent to a preferred range of said pumping and depumping frequencies of electromagnetic radiation, said filter gas cell located in a second area of lower temperature, said filter gas cell containing a resonant medium adapted to absorb energy of electromagnetic radiation within said preferred range of said pumping and depumping frequencies, a gas pumping cell transparent to said same range of frequencies and located in a third area of controlled temperature that is lower than said temperature of said second area, and a heat sink located within said filter gas cell for preventing condensation of said resonant medium on said walls of said filter gas cell.

2. In combination, an optical pumping lamp containing $Rb_{87}$ for generating electromagnetic radiation, said lamp being located in a first controlled temperature area, a filter gas cell optically aligned with said lamp and containing $Rb_{85}$ for absorbing a portion of said electromagnetic radiation, said filter gas cell being located in a second controlled temperature area that is lower than the temperature of said first area, a gas pumping cell optically aligned with said lamp and said filter gas cell and containing $Rb_{87}$, said $Rb_{87}$ being adapted to absorb filtered energy generated by said lamp, said gas pumping cell being located in a third temperature controlled area that is lower than said second temperature of said second area, and a heat sink located within said filter gas cell and connected to a controlled temperature that is lower than said second temperature, thereby causing $Rb_{85}$ in said filter gas cell to condense on said heat sink.

3. A frequency standard comprising:

generating means for generating an optical pumping light beam having energy in pumping and depumping frequencies of electromagnetic radiation, said generating means located in a first temperature controlled area, a filter gas cell having walls transparent to a preferred range of said pumping and depumping frequencies of electromagnetic radiation, said filter gas cell located in a second area of lower temperature, said filter gas cell containing a resonant medium adapted to absorb energy of electromagnetic radiation within said preferred range of said pumping and depumping frequencies, a gas pumping cell transparent to said same range of frequencies and located in a third area of controlled temperature that is lower than said temperature of said second area, said gas pumping cell containing a resonant medium, a heat sink located within said filter gas cell for preventing condensation of said resonant medium on said walls of said filter gas cell, means for detecting a resonant condition in said gas pumping cell by monitoring the intensity changes in said filtered light beam after it has passed through said gas pumping cell means for generating a voltage that varies as said light intensity varies, a voltage controlled oscillator controlled by said voltage, for generating an output signal, means for multiplying said output signal to a frequency substantially equal to the transition frequency between the $F=1$ ground state and $F=2$ ground state of the resonant medium in said gas pumping cell, and a microwave cavity tuned to said transition frequency and energized by said multiplied output signal for depopulating said $F=2$ ground state energy level.

4. A combination according to claim 3 in which said heat sink comprises a tungsten probe penetrating and in sealing relationship with said filter cell.

5. A frequency standard according to claim 3 in which the generating means for generating an optical pumping light beam contains $Rb_{87}$, the resonant medium used in the filter gas cell is $Rb_{85}$, and the resonant medium used in the gas pumping cell is $Rb_{87}$.

References Cited by the Examiner

UNITED STATES PATENTS

| 3,038,126 | 6/1962 | Robison | 331—2 |
| 3,129,389 | 4/1964 | Packard et al. | 331—3 |
| 3,159,797 | 12/1964 | Whitehorn | 331—3 |

OTHER REFERENCES

Andres et al.: "Design Studies for a Rubidium Gas Cell Frequency Standard" in IRE Transactions on Military Electronics, October 1959; pages 178–183.

"Atomic and Molecular Frequency Standards" Instruments and Control Systems; June 1961; pages 1081–1084.

ROY LAKE, *Primary Examiner.*

JOHN KOMINSKI, *Examiner.*

S. H. GRIMM, *Assistant Examiner.*